(12) United States Patent
Rohrlich et al.

(10) Patent No.: US 9,156,511 B2
(45) Date of Patent: Oct. 13, 2015

(54) LED REAR LAMP, IN PARTICULAR FOR A BICYCLE

(71) Applicant: KONINKLIJKE PHILIPS N.V., Eindhoven (NL)

(72) Inventors: Rafael Rohrlich, Aachen (DE); Benno Springer, Aachen (DE); Albrecht Johannes Kraus, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/355,846

(22) PCT Filed: Oct. 25, 2012

(86) PCT No.: PCT/IB2012/055879
§ 371 (c)(1),
(2) Date: May 2, 2014

(87) PCT Pub. No.: WO2013/064948
PCT Pub. Date: May 10, 2013

(65) Prior Publication Data
US 2015/0003111 A1    Jan. 1, 2015

Related U.S. Application Data

(60) Provisional application No. 61/555,026, filed on Nov. 3, 2011.

(51) Int. Cl.
*B62J 6/04* (2006.01)
*B60Q 1/30* (2006.01)
*F21V 8/00* (2006.01)

(52) U.S. Cl.
CPC ... *B62J 6/04* (2013.01); *B60Q 1/30* (2013.01); *G02B 6/0036* (2013.01); *G02B 6/0063* (2013.01); *G02B 6/0095* (2013.01);

(Continued)

(58) Field of Classification Search
USPC ......... 362/511, 540, 541, 543, 544, 545, 555, 362/559, 216, 473, 628
See application file for complete search history.

(56) References Cited

U.S. PATENT DOCUMENTS 6,097,549 A      8/2000  Jenkins et al.
7,160,010 B1 *  1/2007  Chinniah et al. .............. 362/511

(Continued)

FOREIGN PATENT DOCUMENTS

CN    201487766 U    5/2010
DE       4122118 A1    1/1993

(Continued)

*Primary Examiner* — Laura Tso

(57) ABSTRACT

The present invention relates to a LED rear lamp comprising a light guide (1) arranged in or forming part of a housing (10), said light guide (1) having a plate-like shape with a central aperture (2) surrounded by an inner side face (9) of the light guide. One or several LEDs (3) are arranged in the central aperture (2) such that a main emission direction of each LED (3) is aligned towards the inner side face (9) to couple emitted light through the inner side face (9) into the light guide (1). The light guide (1) is designed to guide a first portion (5) of the emitted light to escape through at least two opposing outer side faces (4) of the light guide (1) and to internally reflect or scatter a second portion (6) of the emitted light traveling towards the two outer side faces (4) to escape through a main surface (7) of the light guide (1). With the proposed LED rear lamp a good rear and side visibility is achieved in an efficient manner.

10 Claims, 2 Drawing Sheets

(52) U.S. Cl.
CPC ............. *G02B6/0021* (2013.01); *G02B 6/0068* (2013.01); *G02B 6/0073* (2013.01)

(56) References Cited

U.S. PATENT DOCUMENTS

| | | | |
|---|---|---|---|
| 7,452,114 B2 | 11/2008 | Gasquet | |
| 7,553,037 B2 * | 6/2009 | Sullivan | 362/26 |
| 2009/0129121 A1 * | 5/2009 | Yoneda | 362/628 |
| 2010/0128496 A1 * | 5/2010 | Chang | 362/628 |
| 2013/0021823 A1 * | 1/2013 | Yamagami | 362/613 |

FOREIGN PATENT DOCUMENTS

| | | |
|---|---|---|
| DE | 202010003752 U1 | 8/2010 |
| EP | 1707998 A1 | 10/2006 |
| EP | 1029738 B1 | 4/2007 |
| EP | 1925877 A1 | 5/2008 |
| EP | 2269901 A1 | 5/2008 |
| JP | 2005327649 A | 11/2005 |
| WO | 2013005151 A1 | 1/2013 |

\* cited by examiner

LED REAR LAMP, IN PARTICULAR FOR A BICYCLE

CROSS-REFERENCE TO PRIOR APPLICATIONS

This application is the U.S. National Phase application under 35 U.S.C. §371 of International Application No. PCT/IB2012/055879, filed on Oct. 25, 2012, which claims the benefit of U.S. Provisional Patent Application No. 61/555,026, filed on Nov. 3, 2011. These applications are hereby incorporated by reference herein.

FIELD OF THE INVENTION

The present invention relates to a LED rear lamp comprising a light guide and one or several LEDs which are arranged to couple emitted light into the light guide, at least a portion of the light coupled into the light guide escaping through a main surface of the light guide.

BACKGROUND OF THE INVENTION

Rear lamps for bicycles as well as for any other vehicles have to be designed to provide a good visibility for other motorists and cyclists. For a maximum safety the rear lamp needs to be seen from the back as well as from the side. Commonly known bike rear lamps often use stray light to ensure side visibility which is typically week, or they use additional LEDs just for the side visibility which then do not contribute the back visibility resulting in an extremely inefficient operation.

DE 20 2010 003 752 U1 discloses a LED rear lamp for a bicycle providing a good visibility from the back as well as from the side. The disclosed rear lamp comprises a light guide having a flat main portion passing over in curved side portions. The LED is arranged centrally behind the main portion of the light guide such that a main emission direction of the LED is aligned towards the opposing main surface of the main portion. The light guide is designed to internally reflect the light of the LED towards the side portions. A first portion of this light is then a second time internally reflected to escape through the main surface of the main portion. The second portion through the main surface of the curved side portions. Due to the design of this curved side portions the side visibility is achieved.

SUMMARY OF THE INVENTION

It is an object of the present invention to provide a LED rear lamp having a compact design and allowing an efficient operation with a good back and side visibility. The object is achieved with the LED rear lamp according to claim 1. Advantageous embodiments of the proposed LED rear lamp are subject matter of the dependent claims or are described in the subsequent portions of the description and embodiments.

The proposed LED rear lamp comprises a light guide arranged in or forming part of a housing. The light guide has a plate-like shape with a central aperture surrounded by an inner side face of the light guide. The central aperture can have an arbitrary cross section, for example a circular, elliptical or polygonal cross section. One or several LEDs are arranged in this central aperture such that a main emission direction of each LED is aligned towards the inner side face to couple the light emitted by the LEDs through the inner side face into the light guide. The light guide is designed to guide a first portion of the emitted light to escape through at least two opposing outer side faces of the light guide and to internally reflect or scatter a second portion of the emitted light traveling towards the two outer side faces to escape through a main surface of the light guide, said main surface extending between the inner and outer side faces. The light guide is arranged in or at said housing to allow the passage of the light escaping through the at least two opposing outer side faces and the main surface of the light guide out of the housing.

With such a construction of the LED rear lamp, a perfect rear and side visibility is given. The main portion of the light from the incoupling LEDs is coupled out to the rear side by using dedicated outcoupling structures which internally reflect or scatter the light to the main surface which is directed to the rear side of the lamp. The good visibility from the side is achieved by the direct pass of the light coupled into the light guide towards the outer side faces.

The design of the light guide of the proposed LED rear lamp allows a direct pass of a portion of the light emitted by the LEDs to the outer side faces, i. e. without any further reflection. The remaining portion of the light coupled into the light guide is internally reflected or scattered towards the rear main surface. This allows a very efficient use of the emitted light and thus a very efficient operation of the rear lamp.

In an embodiment of the proposed LED rear lamp the at least two opposing outer side faces of the light guide are structured to additionally shape the light bundle escaping through said outer side faces. Such an additional shaping may form a light bundle having an increased divergence or having portions escaping in the forward direction (i.e. opposed to the rear direction).

In one of the embodiments of the proposed rear lamp, the light guide is arranged such in or at the housing of the lamp that the at least two outer side faces of the light guide, through which the light escapes to the side, forms part of the outer contour of the lamp or housing. Therefore, the light directly escapes through this outer side faces of the light guide to the outside without any further attenuation.

The proposed rear lamp preferably comprises at least two side emitting LEDs which are arranged with their main emission directions towards the two opposing outer side faces. Such side emitting LEDs are commercially available. The main emission direction of the LED corresponds to the central axis of the emission lobe of an LED and coincides with the direction of maximum emission intensity.

The design of the light guide for internally reflecting or scattering the second portion of the light coupled into the light guide may comprise a saw-tooth like or prismatic structure at the surface opposing a main surface. The scattering may also be achieved by small reflecting or scattering particles embedded into the light guide. Also other techniques may be used.

The proposed LED rear lamp is perfectly suitable as a rear lamp of a bicycle or a motorcycle. Nevertheless, such a rear lamp may also be used with other vehicles or objects.

BRIEF DESCRIPTION OF THE DRAWINGS

These and other aspects of the invention will be apparent from and elucidated with reference to the embodiments described herein after. In the drawings.

DETAILED DESCRIPTION OF EMBODIMENTS

Figure 1:
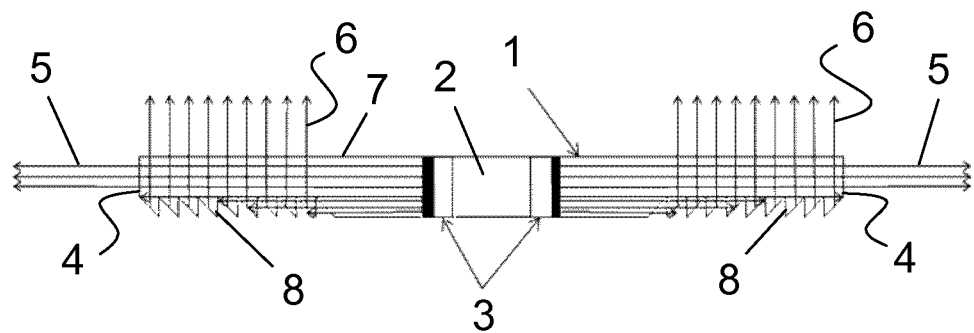
FIG. 1 schematically shows a cross section of an example of the design of the light guide and arrangement of the LEDs of the proposed LED rear lamp.

An exemplary design of the light guide 1 of the proposed LED rear lamp according to the present invention is shown in cross section in FIG. 1. The light guide has a plate-like shape with a central aperture 2 surrounded by an inner side face of the light guide 1. Two side emitter LEDs 3 are arranged on two opposing sides of the aperture 2 such that the main emission direction of each LED 3 is directed towards the inner side face and the outer side faces 4 of the light guide 1. The light guide 1 is designed such that a first portion 5 of the emitted light directly escapes through the outer side faces 4 providing a good side visibility of the rear lamp as indicated in FIG. 1. A second portion 6 of the light emitted by the LEDs 3 and travelling towards the outer side faces 4 is reflected or scattered towards the main surface 7 of the light guide to escape through this main surface 7 to the rear as indicated in the figure. This provides the rear visibility of the proposed LED lamp. In order to internally reflect or scatter the second portion 6 of emitted light, the surface of the light guide 1 is structured on the side opposing the main surface 7 in the present embodiment to have a sawtooth profile 8 in order to reflect the impinging light towards the main surface 7. The main surface 7 extends between the outer side faces 5 and the inner side face bordering the aperture 2 as can be seen from FIG. 1.

Figure 3:
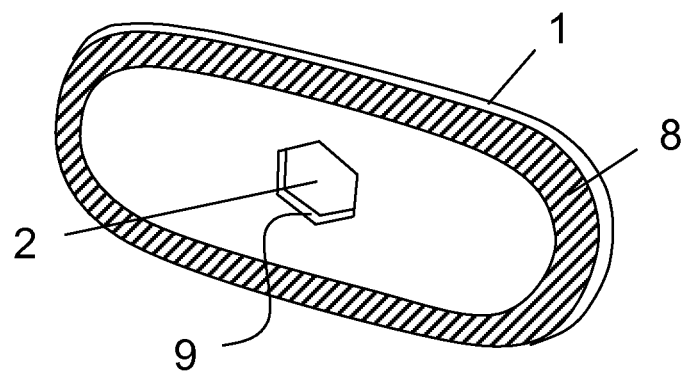
FIG. 3 shows a perspective view of an example of the light guide.

FIG. 3 shows a perspective view of the light guide 1 in which the aperture 2 surrounded by the inner side face 9 as well as the outer side faces 4 can be recognized. The aperture 2 of this embodiment has a hexagonal cross section. With such a cross section for example six side emitting LEDs can be arranged in the aperture 2, each LED corresponding to one straight portion of the hexagonal cross section, in order to allow not only the side visibility at the two curved opposing outer side faces 4 but also at the other outer side faces of the light guide. The figure also shows the area of the saw-tooth profile 8 forming the reflecting structure at the side of the light guide opposing the main surface. This outcoupling structure provides the rear visibility of the lamp which in this embodiment appears from the back side as a ring shaped illumination.

Figure 2:
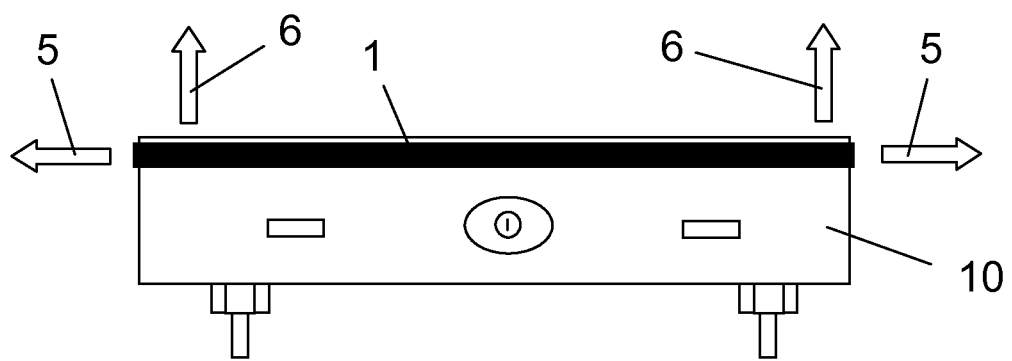
FIG. 2 shows a side view of an example of the rear lamp according to the present invention.

FIG. 2 shows a side view of the complete lamp including the housing 10 of the lamp. The light guide 1 extends to the complete outer contour of the lamp, i. e. the outer side faces 4 form part of the outer contour of the lamp. A battery or any other power supply for the LEDs may be arranged inside of the housing. As an alternative, the LEDs may be connected to an external power supply, for example to the dynamo of a bicycle.

Figure 4:
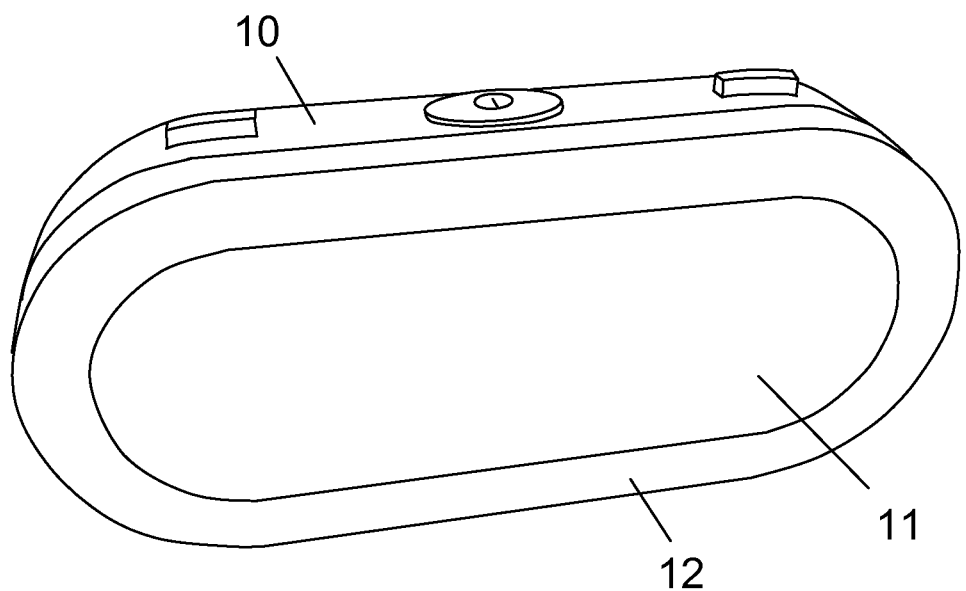
FIG. 4 schematically shows a perspective view of the rear lamp of FIG. 2.

FIG. 4 shows a perspective view of the lamp of FIG. 2. In this view the rear side of the lamp is formed by a central cover 11 for protecting the central portion of the light guide including the LEDs. This central cover 11 is surrounded by an optically transparent cover 12 which allows the passage of the light escaping through the main surface of the light guide to the rear.

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

Although the light guide has preferably a substantially planar main surface, this surface may also be slightly curved. Furthermore, the arrangement of the light guide in the housing is not limited to the disclosed construction and form. The housing may also have another shape or construction. The same applies to the reflecting or scattering structure of the light guide and the area of this reflecting or scattering structure. In the claims, the word "comprising" does not exclude other elements or steps and the indefinite article "a" or "an" does not exclude a plurality. The mere fact that certain measures are cited in mutually different dependent claims does not indicate that a combination of these measures can not be used to advantage. Any reference signs in the claims should not be construed as limiting the scope of the claims.

LIST OF REFERENCE SIGNS 1 light guide
2 aperture
3 side emitter LED
4 outer side face
5 first portion of light
6 second portion of light
7 main surface
8 reflecting structure
9 inner side face
10 housing
11 central cover
12 surrounding cover

The invention claimed is:
1. A LED rear lamp, comprising
a housing;
a plurality of LEDs for emitting light;
a light guide arranged in, at or forming part of the housing;
the light guide having a plate-like shape being designed to guide a first portion of the emitted light to escape through at least two opposing outer side faces of the light guide and to reflect or scatter internally, while traveling towards the two opposing outer side faces, a second portion of the emitted light, such that the second portion of the emitted light escapes through a main surface, the main surface extending between the two opposing outer side faces;
a second side opposing the main surface and at a least portion of the second side having a saw tooth profile to reflect impinging light outward through the main surface, the sawtooth portion formed of a plurality of prismatic structures extending outward and away from the second side, each of the prismatic structures having a normal face directed towards at least a portion of the plurality of LEDs, each of the prismatic structures face being substantially normal to at least a portion of the plurality of LEDs;
said light guide having a central aperture surrounded by an inner side face of the light guide;
the LEDs being arranged in said central aperture such that a main emission direction of such LEDs is aligned towards the inner side face, to couple the emitted light through the inner side face into the light guide, and being aligned towards the two opposing outer side faces, to guide the first portion of the emitted light directly towards the two opposing outer side faces;
said light guide being arranged in, at or forming part of said housing such that the emitted light escapes out of the housing through the two opposing outer side faces and said main surface.

2. The LED rear lamp of claim 1, wherein said LEDs comprise at least two side emitting LEDs.

3. The LED rear lamp of claim 1, wherein said LEDs are arranged with their main emission direction towards the two opposing outer side faces of the light guide.

4. The LED rear lamp of claim 1, wherein the two opposing outer side faces of the light guide form part of an outer contour of the housing.

5. The LED rear lamp of claim 1, wherein the light guide comprises a saw-tooth or prismatic structure at a surface opposing said main surface to reflect or scatter the second portion of the emitted light to escape through the main surface.

6. The LED rear lamp of claim 1, wherein the light guide comprises a planar main surface.

7. The LED rear lamp of claim 1, wherein the two opposing outer side faces of the light guide are structured to additionally shape the light escaping through the two opposing outer side faces.

8. The LED rear lamp of claim 1 being designed to form a rear lamp for a vehicle.

9. The LED rear lamp of claim 1 being designed to form a rear lamp for a motorcycle or a bicycle.

10. An LED rear lamp housing attachable to a bicycle, comprising
- a housing operable to affix to the bicycle;
- a plurality of LEDs for emitting light and positioned within the housing adjacent a light guide;
- the light guide being plate-like and operative to guide a first portion of the emitted light through two opposing outer side faces of the light guide and reflect a second portion of the emitted light while the emitted light is traveling towards the two opposing outer side faces such that the second portion of the emitted light from the LEDs is transmitted through a main surface, the main surface extending between the two opposing outer side faces;
- a second side opposing the main surface and at least a portion of the second side having a saw tooth profile to reflect impinging light outward through the main surface, the sawtooth portion formed of a plurality of prismatic structures extending outward and away from the second side, each of the prismatic structures having a normal face directed towards at least a portion of the plurality of LEDs, each of the prismatic structures face being substantially normal to at least a portion of the plurality of LEDs;
- the light guide having a central aperture surrounded by an inner side face of the light guide;
- the LEDs arranged in the central aperture such that a main emission direction of such LEDs is aligned towards the inner side face to couple the emitted light through the inner side face into the light guide, and
- being aligned towards the two opposing outer side faces to guide the first portion of the emitted light directly towards the two opposing outer side faces;
- the guide forming part of said housing such that the light escapes out of the housing through the two opposing outer side faces and said main surface.

* * * * *